Jan. 13, 1948.                E. H. FISCHER ET AL                 2,434,555
                                ELECTRICAL INSULATOR
                                 Filed May 16, 1944
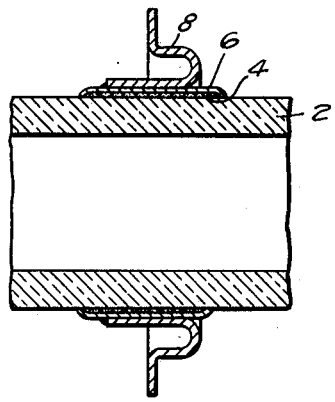
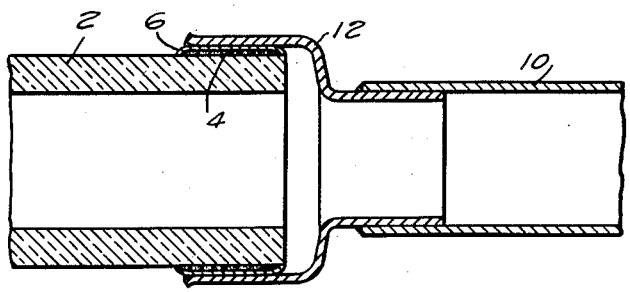
WITNESSES:                                                  INVENTORS
                                                Eugene H. Fischer, John D. Harnish
                                                  and Ralston Russell, Jr.
                                                            BY
                                                                ATTORNEY Patented Jan. 13, 1948

2,434,555

UNITED STATES PATENT OFFICE 2,434,555

ELECTRICAL INSULATOR

Eugene H. Fischer and John D. Harnish, Derry, and Ralston Russell, Jr., Pittsburgh, Pa., assignors to Westinghouse Electric Corporation, East Pittsburgh, Pa., a corporation of Pennsylvania Application May 16, 1944, Serial No. 535,812

2 Claims. (Cl. 174—152)

The invention relates to porcelain insulators, generally, and, particularly, to the production of an electrical insulator to which metallic fittings may be soldered in such manner as to produce a strong and hermetically-tight joint between the metal and porcelain body.

Considerable work has been done in this field in the past but almost without exception it has been impossible to make a joint between the porcelain and metal parts which will be sufficiently strong to be permanent and retain its hermetically-tight characteristics. This is particularly true in the case of small insulating bushings in which it is desired to secure a circular mounting flange. Many types of bushings of this general character are needed in the aircraft industry such, for example, for the leads on radio transformers, capacitors, etc. In this field the container for the transformer or capacitor must be hermetically sealed which, of course, involves sealing the mounting for the bushings. When it is considered that the ambient temperature to which a plane is subjected ranges from far below zero in the stratisphere to temperatures encountered in the tropics, the difficulty of keeping the containers hermetically sealed is a substantial one.

It is an object of the invention to provide a metal-to-porcelain joint which is stronger than those produced in the past and which is maintained hermetically tight over a substantial range in temperature.

Other objects of the invention will be apparent from the following description and the accompanying drawing, in which:

Figure 1 is a view in section of an insulating bushing to which the invention is applied; and Fig. 2 is a view in section of a modified type of bushing mounting.

The insulator itself may be of electrical porcelain which is nonporous and having the necessary strength and electrical characteristics. It may be formed of any of the more common whiteware mixes embodying in various proportions feldspar, flint, china clay and ball clay or it may be one of the special types, such as, for example, zircon, steatite, mullite, or high alumina porcelain. In the case of a tubular bushing, it may be formed, before firing, by the method described in Patent No. 2,301,939, dated November 17, 1942, by means of a mold and die construction as disclosed in my copending application Serial No. 514,493, filed December 16, 1943 and now abandoned. After the bushing is formed it is then fired at a usual temperature of about 1250° C. Of course, the body may be dipped or otherwise coated with a surface glaze before firing if desired.

The drawing shows a tubular bushing, by way of example, but it will be obvious that the invention is applicable to other types and shapes of insulators of the ceramic type. In Fig. 1 the bushing 2 is painted or sprayed with a band 4 of a semi-conducting ceramic material. In the present instance the glaze contains about 80% copper oxide and the rest a lead-borate ceramic glaze material. After application of this band the insulator is fired at about 625° C. to vitrify the glaze. The resulting coating is electrically semiconducting but, of course, of substantial resistance.

Next a coating 6 of metal is electro-plated on the oxide glaze. The metals preferred are zinc, copper or brass. The thickness of the plated coating 6 is exaggerated in Fig. 1; it actually being of the order of thousandths of an inch.

The mounting flange 8 for the bushing may then be slipped in position and soldered in place with a tin-lead solder having a melting temperature of 575° F. to 650° F. At such temperatures the plated metal coating on the bushing will not burn off if the types of metal indicated are used.

If desired, the electro-plating may be facilitated by chemically reducing the surface of the oxide glaze to bare metal. This is not ordinarily necessary, however, with an oxide glaze as above set forth and, in any event there will be some chemical reduction by reaction with the electroplating fluid.

A somewhat similar construction is shown in Fig. 2 where a hermetically-tight joint between the bushing 2 and a metal conduit or pipe 10 is desired. Here again a fired copper oxide layer 4 and electro-plated layer 6 are employed, and a thimble 12 having an enlarged end overlying the electro-plated area and a reduced end suitably brazed or soldered to the conduit 10, is provided.

In order to provide for a greater range of operating temperature at which the bushing will be satisfactory, a new type of porcelain for the bushing appears desirable. It has been found that a satisfactory composition includes predominately milled zircon and calcium silicate zirconium, with comparatively small amounts of ball clay and Bentonite. This result in a very dense porcelain somewhat heavier than usual whiteware but is considerably stronger, has better electrical characteristics and resistance to thermal shock. Here again the layers or bands of copper oxide glaze and electro-plated metal are applied but the metal mounting flange or fitting is secured in place by a high-temperature solder, such as a silver solder, which flows at approximately 1175° to 1200° F. This type of construction may be used over the temperature range of about −60° F. to 1000° F. without adversely affecting the joint between the mounting flange or fitting and the bushing.

In accordance with the invention an improved insulator construction results which is relatively simple in construction and which maintains a desired hermetically-tight joint between the bushing hardware and porcelain of a substantial range in temperature. Further, for extreme ranges of temperature a bushing with a joint of this type is provided in which the bushing itself is a zircon-porcelain with the metal fittings secured thereto with a high-temperature solder.

Modifications, of course, may be made in the materials and technique above set forth and it is intended that the invention be limited only by the scope of the appended claims.

We claim as our invention:

1. An insulator comprising a ceramic body having a glaze coating on a portion of the surface thereof comprising a fired mixture predominately of copper oxide and a lesser amount of lead borate, and a metallic surface overlying said glaze and constituting a part thereof.

2. An insulator comprising a ceramic body having a glaze coating on a portion of the surface thereof comprising a fired mixture predominately of copper oxide and a lesser amount of lead borate, and a metallic surface overlying said glaze and constituting a part thereof and comprising an electro-plated metallic film.

EUGENE H. FISCHER.
JOHN D. HARNISH.
RALSTON RUSSELL, Jr.

REFERENCES CITED

The following references are of record in the file of this patent:

UNITED STATES PATENTS

| Number | Name | Date |
|---|---|---|
| 2,075,477 | Smith | Mar. 30, 1937 |
| 2,194,886 | Dallenbach | Mar. 26, 1940 |
| 2,139,431 | Vatter | Dec. 6, 1938 |
| 1,987,683 | Hunt et al. | Jan. 15, 1935 |
| 1,852,093 | Smede et al. | Apr. 5, 1932 |
| 2,118,795 | Littleton | May 24, 1938 |
| 893,811 | Pickard | July 21, 1908 |
| 2,200,694 | Gerecke et al. | May 14, 1940 |
| 1,281,917 | Eby | Oct. 15, 1918 |
| 1,997,688 | Hunt et al. | Apr. 16, 1935 |
| 1,997,666 | Whisler | Apr. 16, 1935 |
| 227,370 | Man | May 11, 1880 |
| 2,272,338 | Fessler et al. | Feb. 10, 1942 |